US012688528B2

(12) United States Patent
Balraj et al.

(10) Patent No.: US 12,688,528 B2
(45) Date of Patent: Jul. 21, 2026

(54) RESOURCES

(71) Applicant: Texas Instruments Incorporated,
Dallas, TX (US)

(72) Inventors: Rajkumar Balraj, Allen, TX (US);
Susan Jean Allen, Dallas, TX (US)

(73) Assignee: TEXAS INSTRUMENTS
INCORPORATED, Dallas, TX (US)

( * ) Notice: Subject to any disclaimer, the term of this
patent is extended or adjusted under 35
U.S.C. 154(b) by 26 days.

(21) Appl. No.: 17/330,259

(22) Filed: May 25, 2021

(65) Prior Publication Data

US 2022/0138839 A1 May 5, 2022

Related U.S. Application Data

(60) Provisional application No. 63/107,062, filed on Oct.
29, 2020.

(51) Int. Cl.
*G06Q 30/0601* (2023.01)
*G06F 3/04842* (2022.01)
(Continued)

(52) U.S. Cl.
CPC ..... *G06Q 30/0643* (2013.01); *G06F 3/04842*
(2013.01); *G06F 3/04845* (2013.01);
(Continued)

(58) Field of Classification Search
CPC ........... G06Q 30/0643; G06Q 30/0621; G06Q
30/00; G06Q 30/06; G06Q 30/0601;
(Continued)

(56) References Cited

U.S. PATENT DOCUMENTS 8,185,446 B1 * 5/2012 Kuznetsova ......... G06Q 30/016
705/26.1
8,285,602 B1 * 10/2012 Yi .......................... G06Q 30/00
705/26.7
(Continued)

FOREIGN PATENT DOCUMENTS

CN          1455610 A  * 11/2003
JP      2002312648 A  * 10/2002

OTHER PUBLICATIONS

"Altera Product Selector," webpage <http://www.altera.com/>, 10
pages, Jul. 28, 2014, retrieved from Internet Archive Wayback
Machine <https://web.archive.org/web/20140728192820/http://www.
altera.com/> on Jan. 16, 2025. (Year: 2014).*
(Continued)

*Primary Examiner* — Matthew Ell
*Assistant Examiner* — Blaine T Basom
(74) *Attorney, Agent, or Firm* — Michelle F. Murray;
Frank D. Cimino

(57) ABSTRACT

A method is provided that includes displaying packages for
a semiconductor product in a graphical user interface (GUI),
by at least one processor, wherein each package includes
design resources for a respective design use case for the
semiconductor product, and displaying, by the at least one
processor, design resources included in a package of the
packages in the GUI responsive to user selection of the
package.

20 Claims, 11 Drawing Sheets

(51) Int. Cl.
    *G06F 3/04845*     (2022.01)
    *G06F 9/451*     (2018.01)

(52) U.S. Cl.
    CPC ......... *G06F 9/453* (2018.02); *G06Q 30/0621*
    (2013.01); *G06Q 30/0627* (2013.01)

(58) Field of Classification Search
    CPC .......... G06Q 30/0641; G06Q 30/0623; G06Q
        30/0625; G06Q 30/0627; G06Q 30/0633;
        G06F 3/04842; G06F 3/04845; G06F
        9/453
    See application file for complete search history.

(56)               References Cited

U.S. PATENT DOCUMENTS

| | | | | |
|---|---|---|---|---|
| 8,713,560 | B2 * | 4/2014 | Neumann | G06Q 30/06 |
| | | | | 717/174 |
| 9,058,190 | B2 * | 6/2015 | Kline | G06F 9/445 |
| 9,483,789 | B1 * | 11/2016 | Hanlon | G06Q 30/0631 |
| 11,436,665 | B1 * | 9/2022 | Abdul Kadar | G06Q 30/0643 |
| 11,468,786 | B2 * | 10/2022 | Gupta | G06F 9/453 |
| 2002/0004764 | A1 * | 1/2002 | Stolze | G06Q 30/02 |
| | | | | 705/26.8 |
| 2003/0033218 | A1 * | 2/2003 | Flaxer | G06Q 30/0635 |
| | | | | 705/26.7 |
| 2006/0085290 | A1 * | 4/2006 | Pohoryles | G06Q 10/06375 |
| | | | | 705/27.1 |
| 2008/0288372 | A1 * | 11/2008 | Cue | G06Q 30/0605 |
| | | | | 705/26.2 |
| 2012/0330778 | A1 * | 12/2012 | Eastham | G06Q 30/02 |
| | | | | 705/26.7 |
| 2013/0317952 | A1 * | 11/2013 | Tomassetti | G06Q 30/0641 |
| | | | | 705/27.1 |
| 2014/0007057 | A1 * | 1/2014 | Gill | G06F 8/61 |
| | | | | 717/126 |
| 2018/0352082 | A1 * | 12/2018 | Liu | H04L 67/75 |
| 2019/0108575 | A1 * | 4/2019 | Gupta | G06Q 30/0633 |
| 2019/0213665 | A1 * | 7/2019 | Liew | G06Q 30/0643 |

OTHER PUBLICATIONS

Nelson, Rick. "Evaluation kits, reference designs offer a head start." EE-Evaluation Engineering 56.3 (2017): 18-21. (Year: 2017).*

* cited by examiner

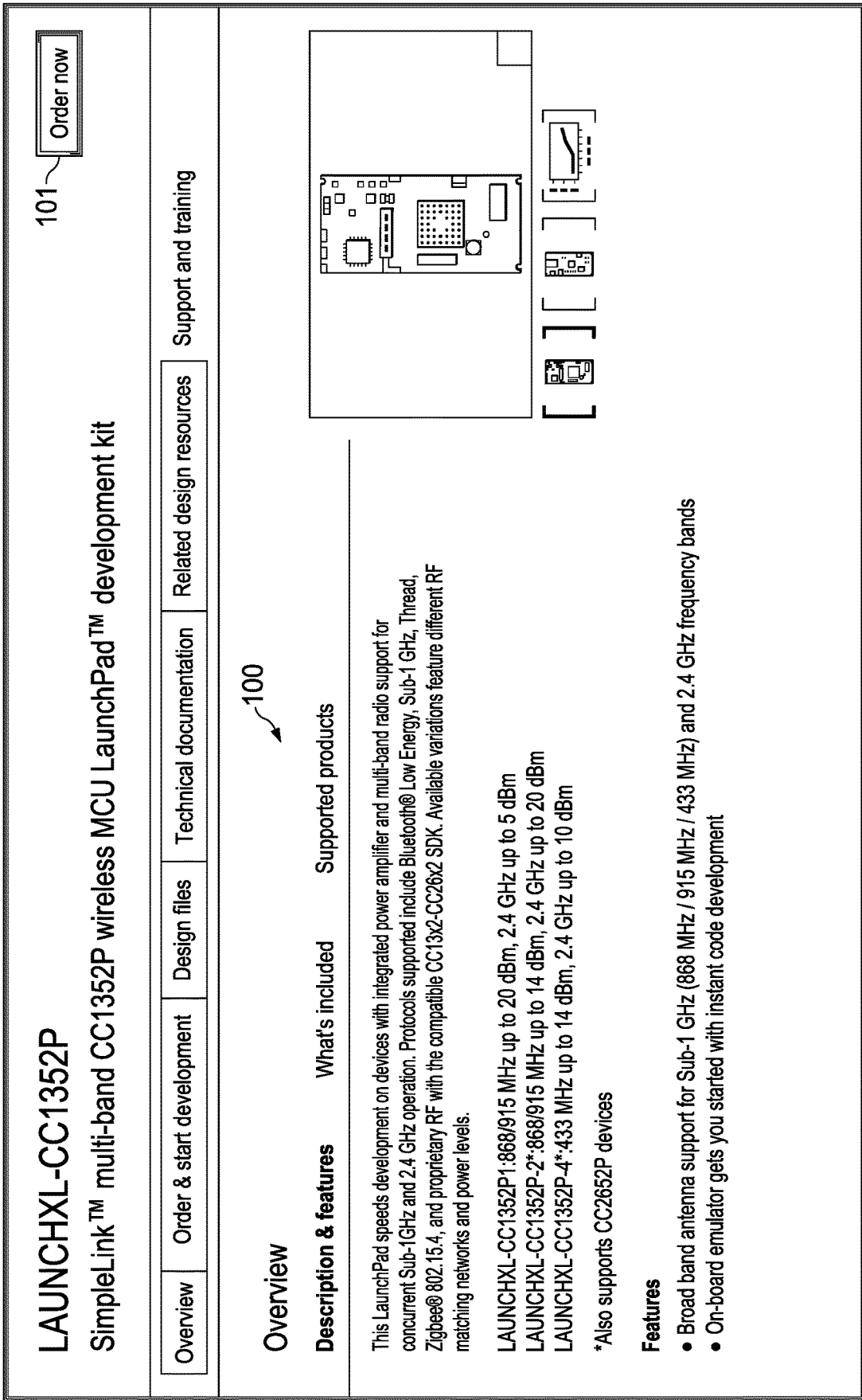

LAUNCHXL-CC1352P

SimpleLink™ multi-band CC1352P wireless MCU LaunchPad™ development kit

101

Order now

| Overview | Order & start development | Design files | Technical documentation | Related design resources | Support and training |

100

Overview

Description & features    What's included    Supported products

This LaunchPad speeds development on devices with integrated power amplifier and multi-band radio support for concurrent Sub-1GHz and 2.4 GHz operation. Protocols supported include Bluetooth® Low Energy, Sub-1 GHz, Thread, Zigbee® 802.15.4, and proprietary RF with the compatible CC13x2-CC26x2 SDK. Available variations feature different RF matching networks and power levels.

LAUNCHXL-CC1352P1:868/915 MHz up to 20 dBm, 2.4 GHz up to 5 dBm
LAUNCHXL-CC1352P-2*:868/915 MHz up to 14 dBm, 2.4 GHz up to 20 dBm
LAUNCHXL-CC1352P-4*:433 MHz up to 14 dBm, 2.4 GHz up to 10 dBm

*Also supports CC2652P devices

Features

● Broad band antenna support for Sub-1 GHz (868 MHz / 915 MHz / 433 MHz) and 2.4 GHz frequency bands
● On-board emulator gets you started with instant code development

FIG. 1A

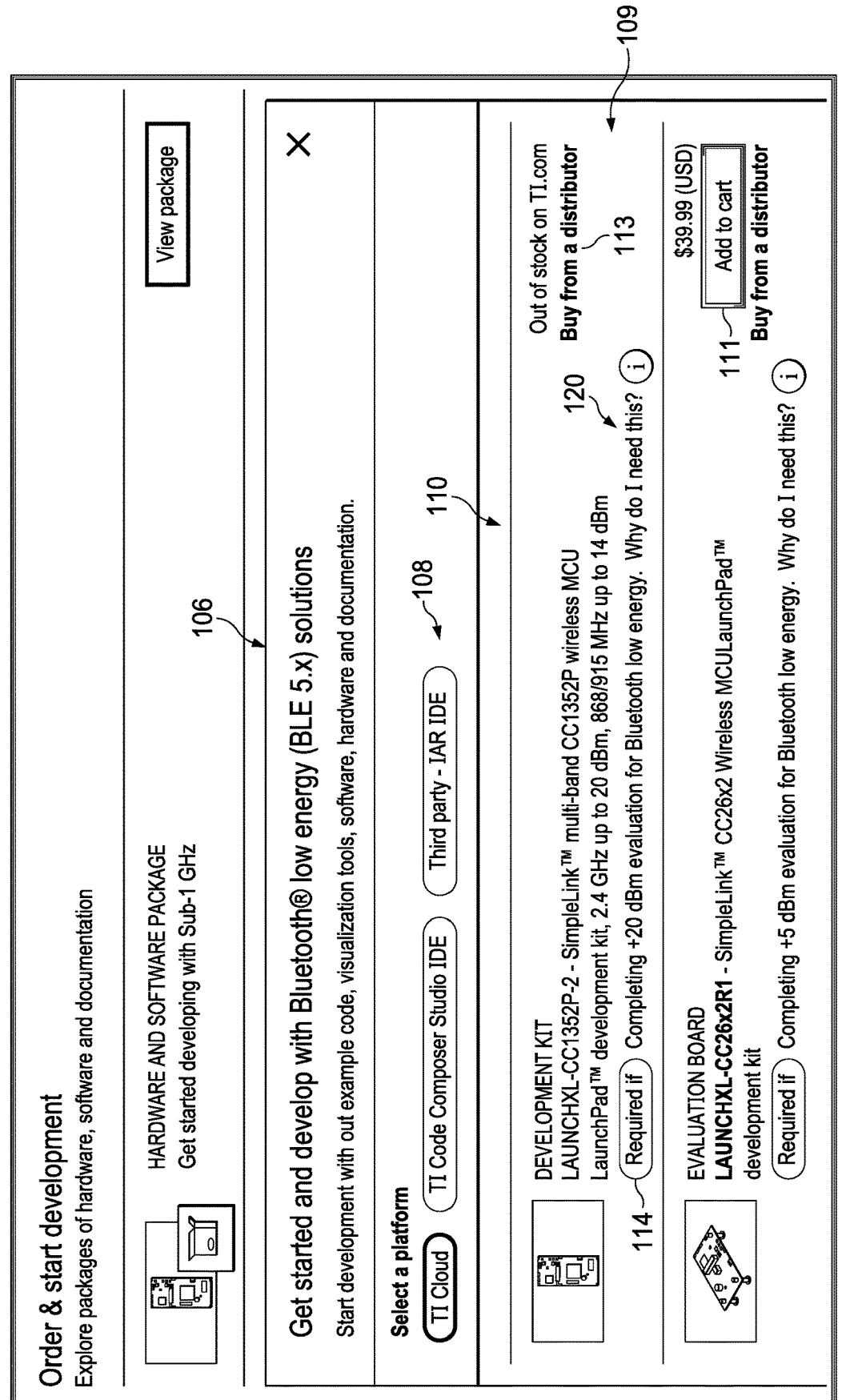

Order & start development
Explore packages of hardware, software and documentation HARDWARE AND SOFTWARE PACKAGE
Get started developing with Sub-1 GHz View package

106

109

Get started and develop with Bluetooth® low energy (BLE 5.x) solutions    ✕

Start development with out example code, visualization tools, software, hardware and documentation.

Select a platform

( TI Cloud )    ( TI Code Composer Studio IDE )    ( Third party - IAR IDE )

108

110

DEVELOPMENT KIT
LAUNCHXL-CC1352P-2 - SimpleLink™ multi-band CC1352P wireless MCU
LaunchPad™ development kit, 2.4 GHz up to 20 dBm, 868/915 MHz up to 14 dBm ( Required if )    Completing +20 dBm evaluation for Bluetooth low energy.    Why do I need this? ⓘ

114

Out of stock on TI.com
Buy from a distributor

120

113

EVALUATION BOARD
LAUNCHXL-CC26x2R1 - SimpleLink™ CC26x2 Wireless MCULaunchPad™
development kit ( Required if )    Completing +5 dBm evaluation for Bluetooth low energy.    Why do I need this? ⓘ

$39.99 (USD)

Add to cart

111

Buy from a distributor

FIG. 1C

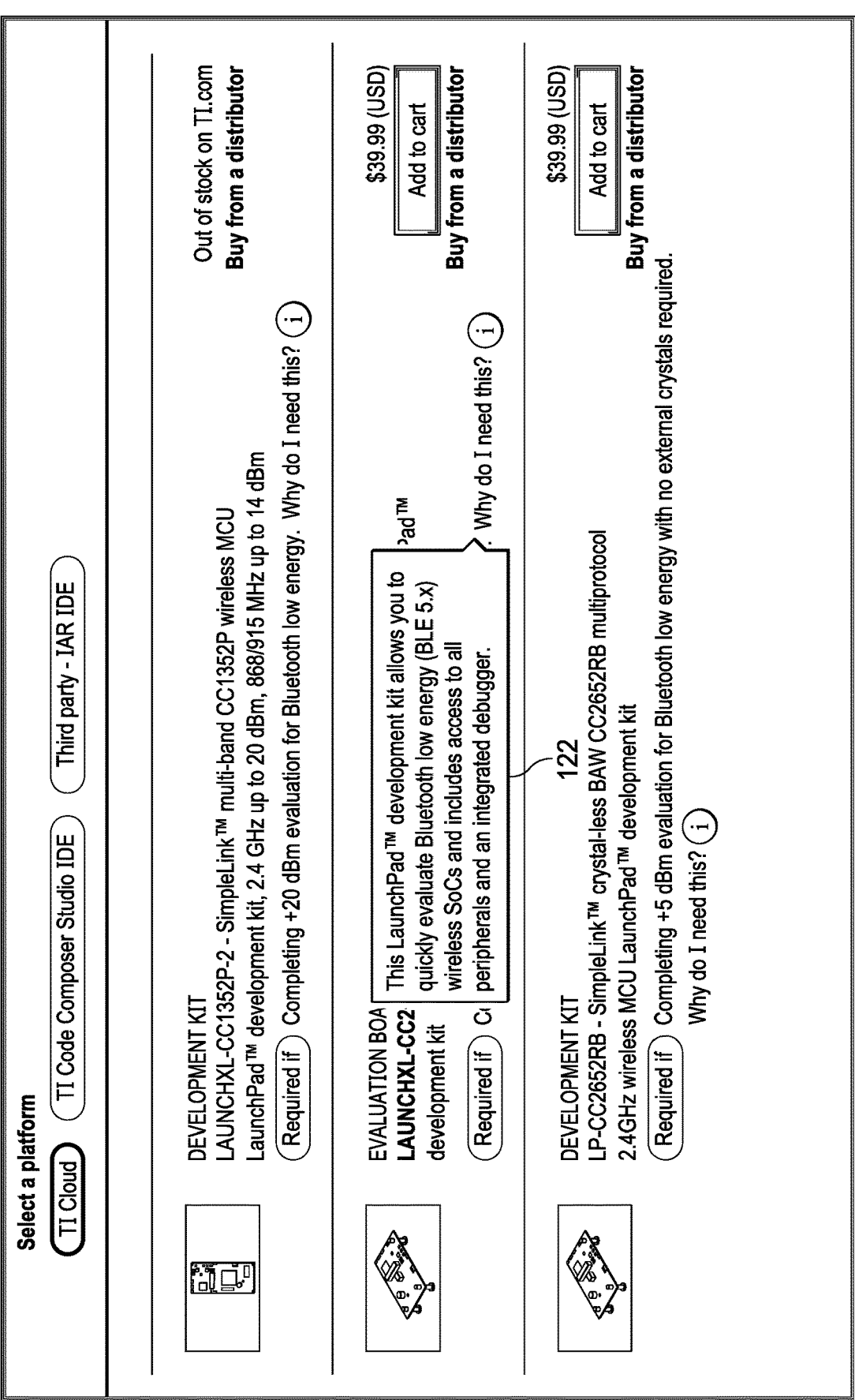

Select a platform

( TI Cloud )    ( TI Code Composer Studio IDE )    ( Third party - IAR IDE )

DEVELOPMENT KIT
LAUNCHXL-CC1352P-2 - SimpleLink™ multi-band CC1352P wireless MCU
LaunchPad™ development kit, 2.4 GHz up to 20 dBm, 868/915 MHz up to 14 dBm ( Required if )  Completing +20 dBm evaluation for Bluetooth low energy.  Why do I need this? (i)

Out of stock on TI.com
Buy from a distributor

EVALUATION BOA
LAUNCHXL-CC2
development kit

This LaunchPad™ development kit allows you to
quickly evaluate Bluetooth low energy (BLE 5.x)
wireless SoCs and includes access to all
peripherals and an integrated debugger.

Pad™

. Why do I need this? (i)

122

( Required if )  C $39.99 (USD)

[ Add to cart ]

Buy from a distributor

DEVELOPMENT KIT
LP-CC2652RB - SimpleLink™ crystal-less BAW CC2652RB multiprotocol
2.4GHz wireless MCU LaunchPad™ development kit ( Required if )  Completing +5 dBm evaluation for Bluetooth low energy with no external crystals required.
Why do I need this? (i)

$39.99 (USD)

[ Add to cart ]

Buy from a distributor

FIG. 1E

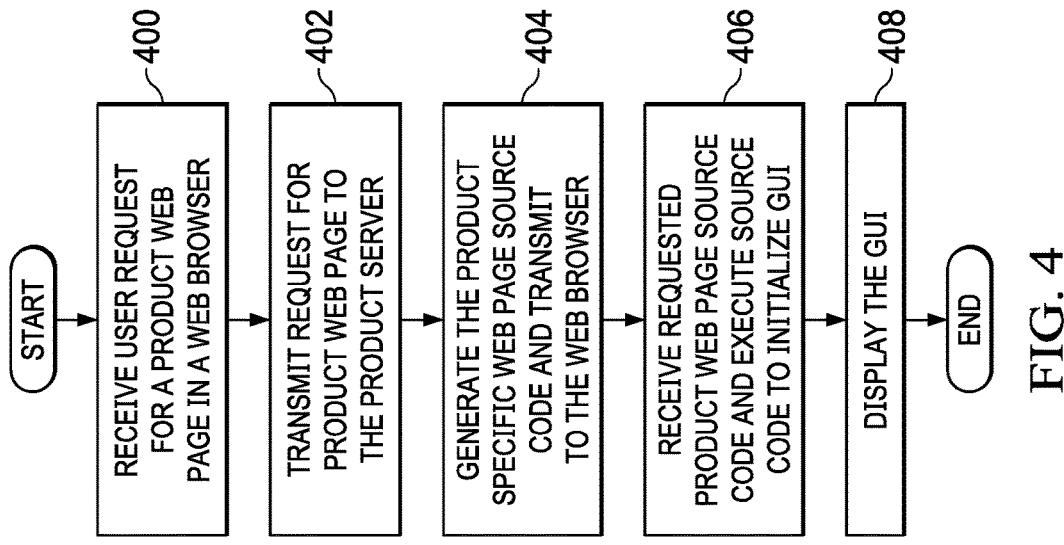

FIG. 4

START

400 — RECEIVE USER REQUEST FOR A PRODUCT WEB PAGE IN A WEB BROWSER

402 — TRANSMIT REQUEST FOR PRODUCT WEB PAGE TO THE PRODUCT SERVER

404 — GENERATE THE PRODUCT SPECIFIC WEB PAGE SOURCE CODE AND TRANSMIT TO THE WEB BROWSER

406 — RECEIVE REQUESTED PRODUCT WEB PAGE SOURCE CODE AND EXECUTE SOURCE CODE TO INITIALIZE GUI

408 — DISPLAY THE GUI

END

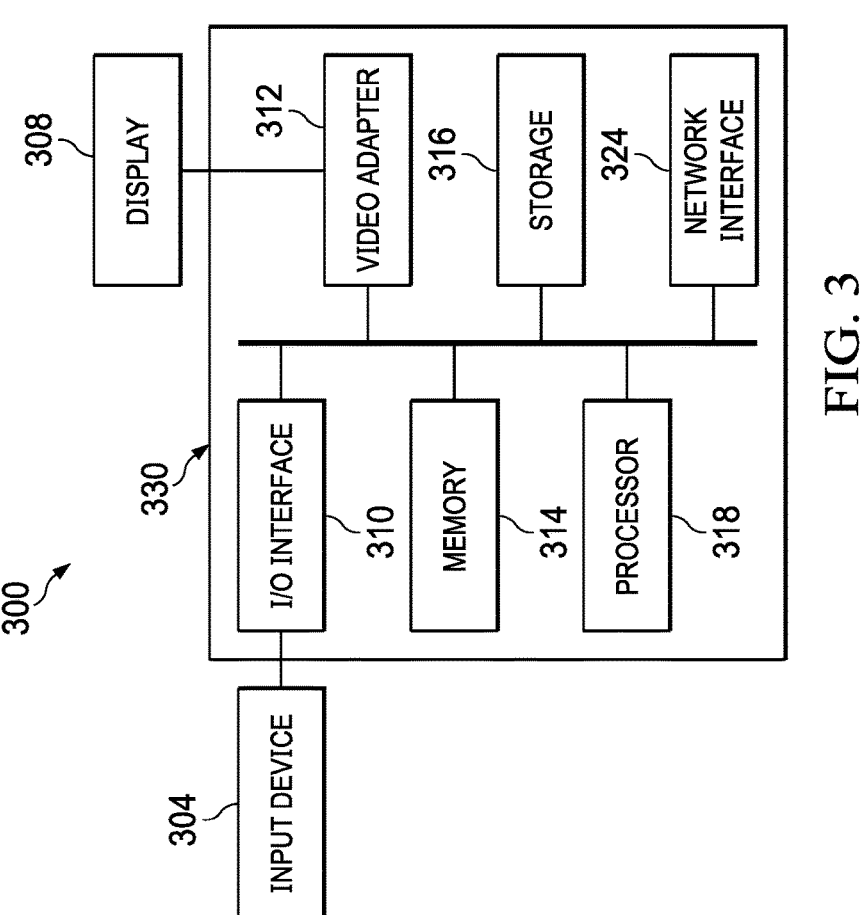

308 — DISPLAY

304 — INPUT DEVICE

310 — I/O INTERFACE

312 — VIDEO ADAPTER

314 — MEMORY

316 — STORAGE

318 — PROCESSOR

324 — NETWORK INTERFACE

RESOURCES

CROSS-REFERENCE TO RELATED APPLICATIONS

This application claims benefit of U.S. Provisional Patent Application No. 63/107,062 filed Oct. 29, 2020, which Application is hereby incorporated herein by reference in its entirety.

BACKGROUND

Current product web sites provided by semiconductor companies tend to organize product information by type, e.g., hardware, software, technical documents, reference designs, etc. Presenting the information in this fashion can make it difficult for system designers to determine what hardware and software they need to acquire for a design, especially if a system designer desires to purchase evaluation/development boards and software for prototyping the design.

SUMMARY

Embodiments of the present disclosure relate to presentation of design resource for a semiconductor product in a graphical user interface (GUI). In one aspect, A method is provided that includes displaying packages for a semiconductor product in a graphical user interface (GUI), by at least one processor, wherein each package includes design resources for a respective design use case for the semiconductor product, and displaying, by the at least one processor, design resources included in a package of the packages in the GUI responsive to user selection of the package.

In one aspect, a digital device is provided that includes a display device and at least one processor coupled to the display device and the at least one processor configured to instruct the display device to display packages for a semiconductor product in a graphical user interface (GUI), wherein each package includes design resources for a respective design use case for the semiconductor product, and instruct the display device to display design resources included in a package of the packages in the GUI responsive to receiving user selection of the package.

In one aspect, a non-transitory computer-readable medium storing software instructions is provided in which the software instructions include software instructions to instruct at least one processor to instruct a display device to display packages for a semiconductor product in a graphical user interface (GUI), wherein each package comprises design resources for a respective design use case for the semiconductor product, and instruct the display device to display design resources comprised in a package of the packages in the GUI responsive to user selection of the package.

BRIEF DESCRIPTION OF THE DRAWINGS

FIGS. 1A-1H are an example illustrating a graphical user interface (GUI) for presenting design resources by design use case;

FIG. 3 is a block diagram of an example digital system;

FIG. 4 is a flow diagram of a method for providing an embodiment of a graphical user interface (GUI) in a web browser on a user device.

DETAILED DESCRIPTION

Figure 1B:
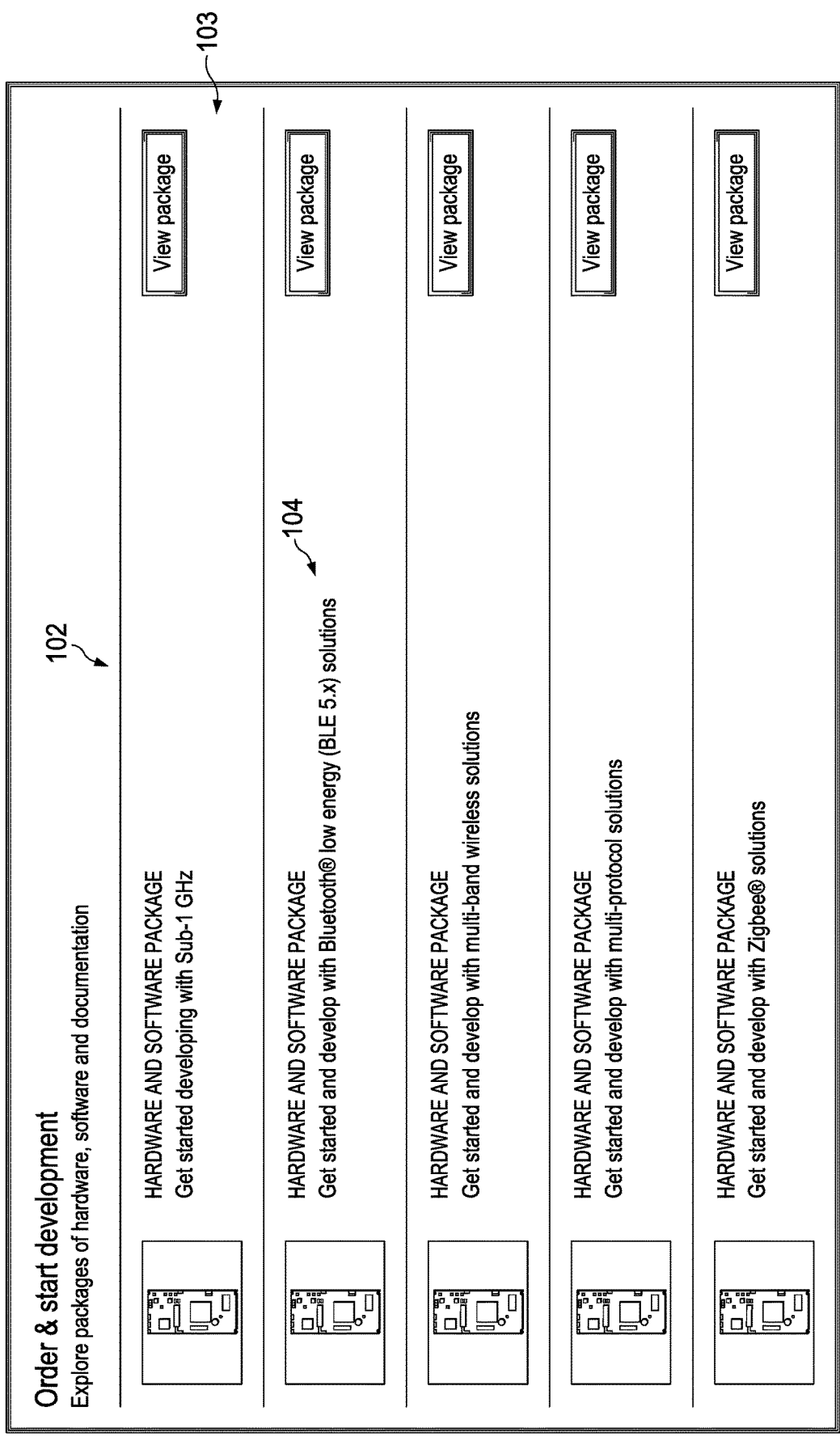

Specific embodiments of the disclosure are described herein in detail with reference to the accompanying figures. Like elements in the various figures are denoted by like reference numerals for consistency.

Embodiments of the disclosure provide a graphical user interface (GUI) for a semiconductor product website that organizes and presents design resources, e.g., hardware, software, documentation, training, etc., for some products according to design use cases for the products. Using such a GUI, a system designer selects a package for a particular design use case for a product and is presented with a display of the design resources included in the package, e.g., required and optional hardware and software for the particular use case, and other relevant design resources such as documentation, training, and/or reference designs.

A package, the content of which may be determined based on, for example, engineering knowledge of the product, customer life cycle needs, and knowledge of the application of the design resources, may provide the system designer with a single-source location to obtain the design resources for a desired design. Further, explanatory text included with each package provides the system designer with explanations of why a particular package or a design resource in a package would be needed. In addition, in some embodiments, when relevant, the GUI allows the system designer to select a software execution platform and then modifies the displayed package contents according to the selected platform to further guide the system designer as to the needed design resources.

FIGS. 1A-1H are an example illustrating a GUI for presenting design resources by design use case in accordance with some embodiments. In this example, as shown in FIGS. 1A and 1B, a user has accessed a semiconductor product website and opened a web page for a product, i.e., a development kit for a multi-band wireless microcontroller unit (MCU). The GUI presented to the user in the web page includes an overview section 100 (FIG. 1A) and a package section 102 (FIG. 1B). In this example, the content of FIG. 1B is a continuation of the web page and may be seen when the user scrolls through the web page. The overview section 100 includes one or more images of the product and a brief description of the product. As is illustrated in this example, the brief description may include a listing of the available variations of the product, if any.

One or more other sections (not shown) containing links to items relevant to the selected product may also be included in the GUI such as, for example, a technical documentation section, a design files section, a support and training section, and a related design resources section. If the user selects the "Order now" button 101, the web page view is moved to the "Order & start development" portion of the web page that includes the package section 102 as illustrated in FIG. 1B.

The package section 102 includes multiple package regions, e.g., package region 103. Each package region includes a brief description of the design use case for a package of design resources, e.g., hardware and software, for the product and a view package button. These brief descriptions inform the user why the user might want each package. Each package corresponds to a particular design use case for the product, e.g., Sub-1 GHz, Bluetooth low energy (BLE), multi-band wireless, multi-protocol, and Zigbee. The user can select the view package button for the particular package of interest to view the contents of the package.

Figure 1D:
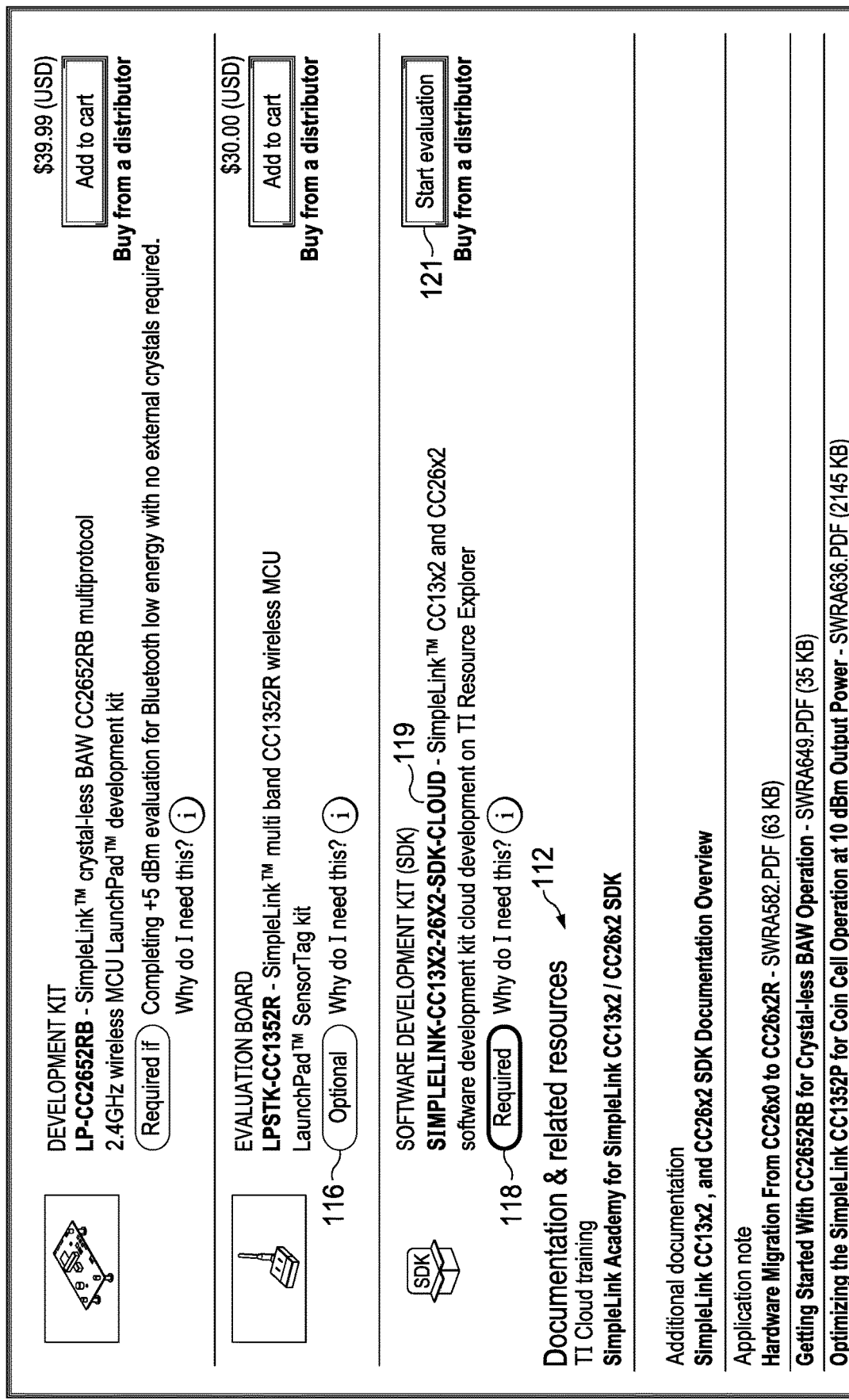

User selection of a view package button activates a display of the design resources applicable to the package design use case, e.g., hardware resources, software resources, and documentation and related resources. In this example, a collapsible window with the package content is inserted into the product web page at the location of the package region. Any content of the web page below the package region is moved below the collapsible window. FIGS. 1C and 1D show a portion of the GUI with a collapsible window 106 inserted after selection of the view package button for the Bluetooth solution package 104 (FIG. 1B).

The collapsible window 106 includes a platform selection section 108, a package resources section 110, and a documentation and other resources section 112. The user can collapse the collapsible window 106 by selecting the X in the upper right corner. In other embodiments, alternative approaches to displaying package design resources may be used, e.g., displaying the design resources for a selected package in another web page, for example in a new tab of a web browser or a new window, or replacing the content of the current web page with the package content.

The platform selection section 108 includes buttons for selecting a platform for software execution. The particular software execution platform options included in this section are dependent on the product and package. In this example, the software execution platform options include two integrated development environments (IDEs) and a cloud based software development kit (SDK). In general, an IDE or SDK is a suite of software tools for developing and debugging software applications. In this example, the IDEs available for developing software for the selected package include TI Code Composer Studio™ and an IDE available from a third party, IAR Systems. In addition, a cloud based SDK referred to generically as TI Cloud is available. The default selection when the package is selected is TI Cloud. For other products/packages, platform options may include, for example, operating systems such as Microsoft® Windows®, Linux®, and MAC OS® and/or downloadable SDKs. Further, for some packages, there is one option for the software execution platform and the platform selection section is not displayed.

As is illustrated below herein, changing the platform selection may change the content of the package resources section 110. While not specifically illustrated herein, in some embodiments, changing the platform selection may also change the content of the documentation and other resources section 112. In the example of FIGS. 1C and 1D, the selected platform is the TI Cloud. In this example, the required software resource 119 when TI Cloud is selected is a cloud based SDK. User selection of the "Start evaluation" button 121 opens a new web page displaying information about the SDK including links for documentation, examples, downloading, etc.

The package resources section 110 includes multiple resource regions, e.g., resource region 109. Each resource region includes information about a hardware or software product relevant to the selected package 104, the Bluetooth® solutions package. The information in a resource region includes a product identifier and a brief description of the product. The product identifier may also be a selectable link to a web page containing further information about that product. In addition, each resource region includes an indication of whether the product named in the resource region is required 118 for the design use case and selected development platform, is optional 116, or is required if 114 the described design goal is to be achieved.

In this example, to purchase a product, the user may select the "Add to cart" button 111 for any of the hardware products (resources) shown. Selecting the button adds the product to a virtual shopping cart and activates a popup window displaying options to check out or to continue shopping. If the user selects the option to check out in the popup window, a new web page is opened that allows the user to complete the purchase, e.g., by entering shipping and payment information. Alternatively, the user may select a link "Buy from a distributor" 113 for displayed hardware products that are available from a distributor. Selecting the link activates a popup window showing the available distributors with a selectable link for the product web page on each distributor web site. In other examples, selecting the link causes a new tab of the web browser or a new window to display selectable links for the product web pages on each distributor web site.

In other embodiments, rather than adding products to a virtual cart one at a time, the user can select multiple products in a package for purchase and then have the selected products added to a virtual shopping cart. For example, the "Add to cart" buttons in the relevant resource regions can be replaced with "Select" buttons that change color when a product is selected or with check boxes that display a check mark or X when a product is selected. Another suitably labelled user selectable button can be added to a package resources section, e.g., at the top or bottom of the section, that, when selected by the user, adds the selected products to a virtual shopping cart.

Further, each resource region includes a tooltip 120 the user may select for a brief explanation of why the product (resource) named in the resource region might be needed. A tooltip, also known as an infotip or hint, is a GUI element which causes a text box to be displayed when a mouse hovers over the element. FIG. 1E shows an example tooltip text box 122 for the tooltip 120.

The documentation and other resources section 112 provides links to relevant web pages for training, additional documentation, and application notes. Selection of any of these links by the user opens a new web page that displays the relevant content. For example, user selection of any of the application note links displays the pdf of the selected application note in a new web page. Other links that may be included in other embodiments include links to videos and support forum questions relevant to the package.

Figure 1F:
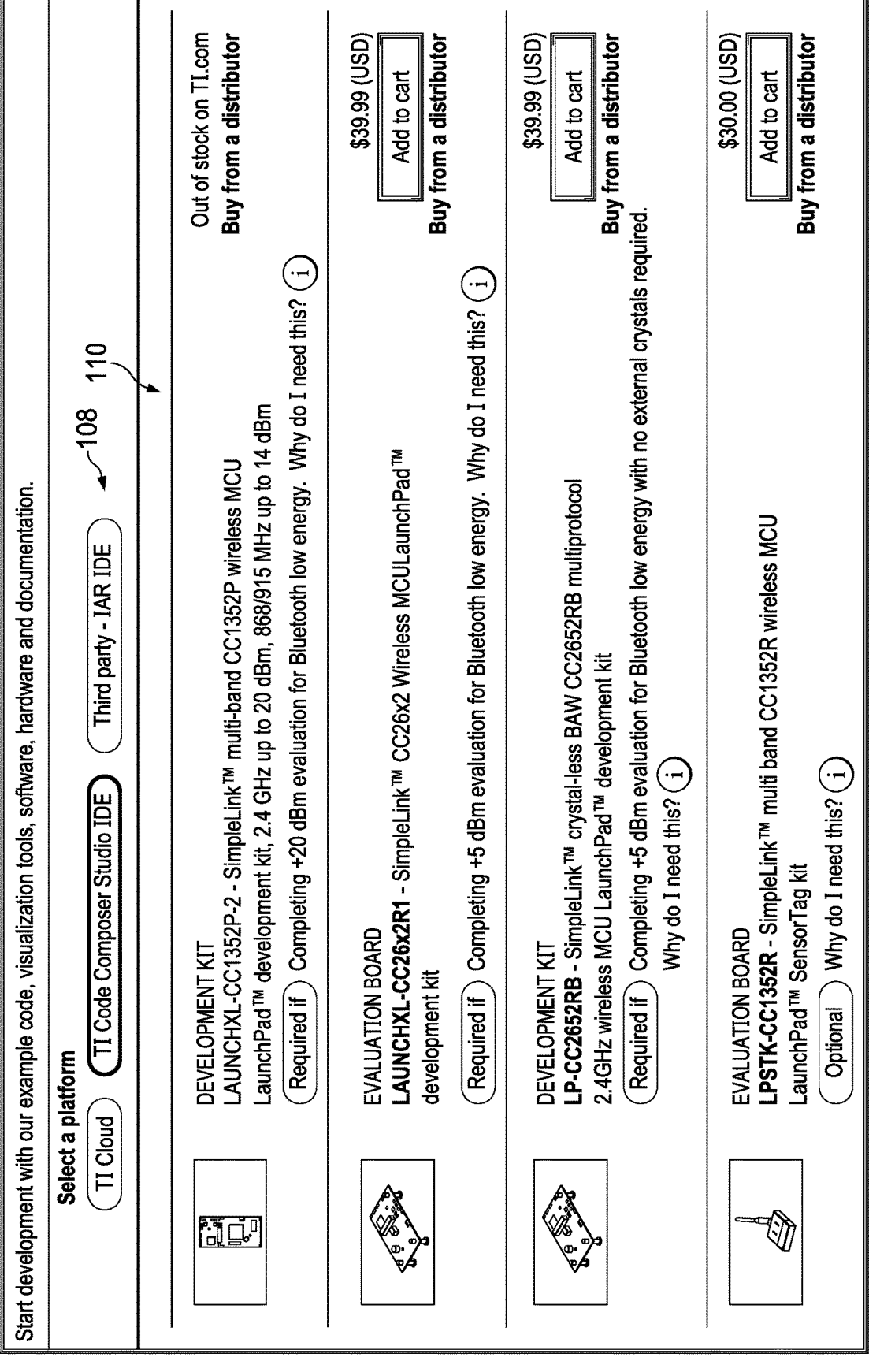
Figure 1G:
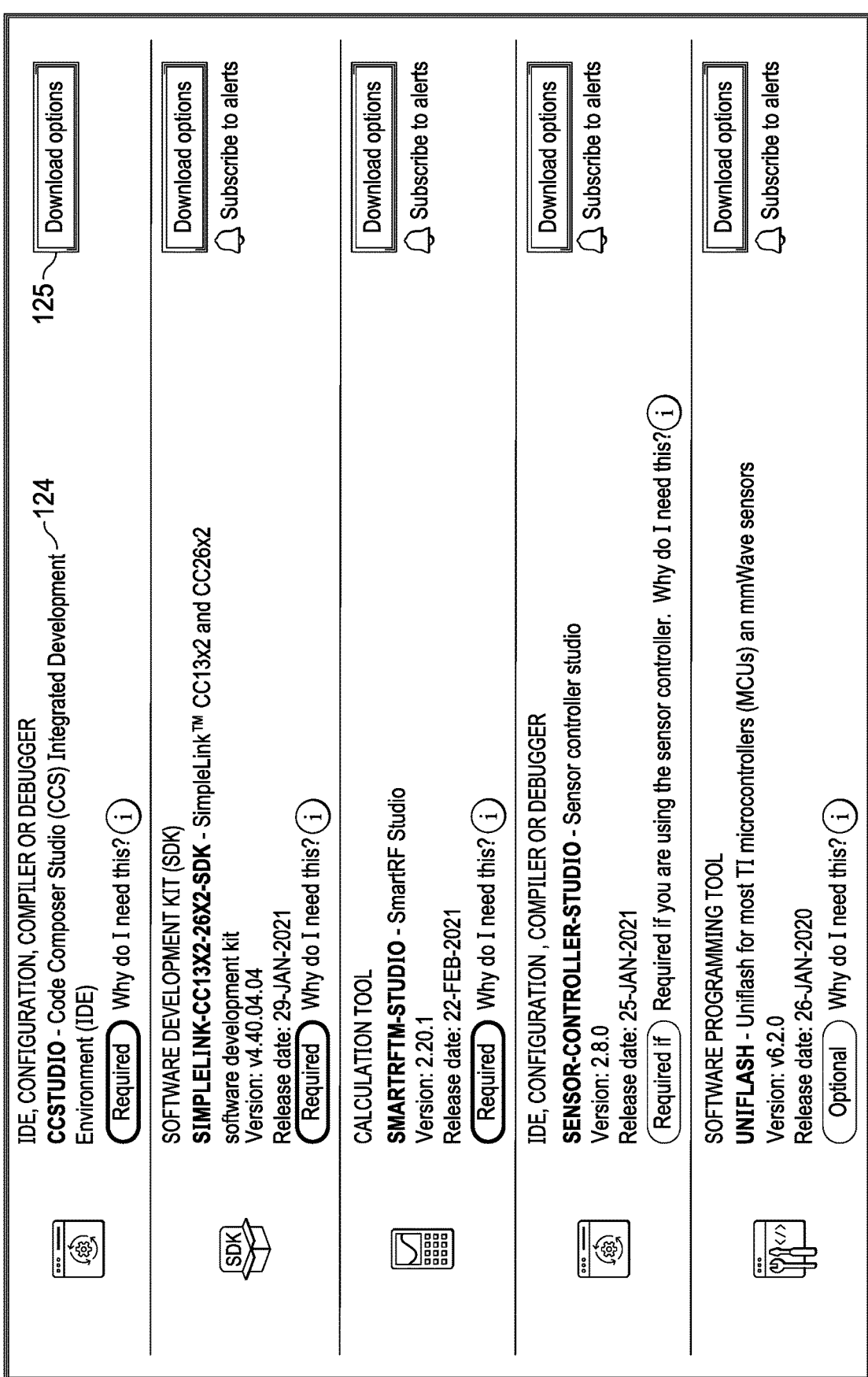
Figure 1H:
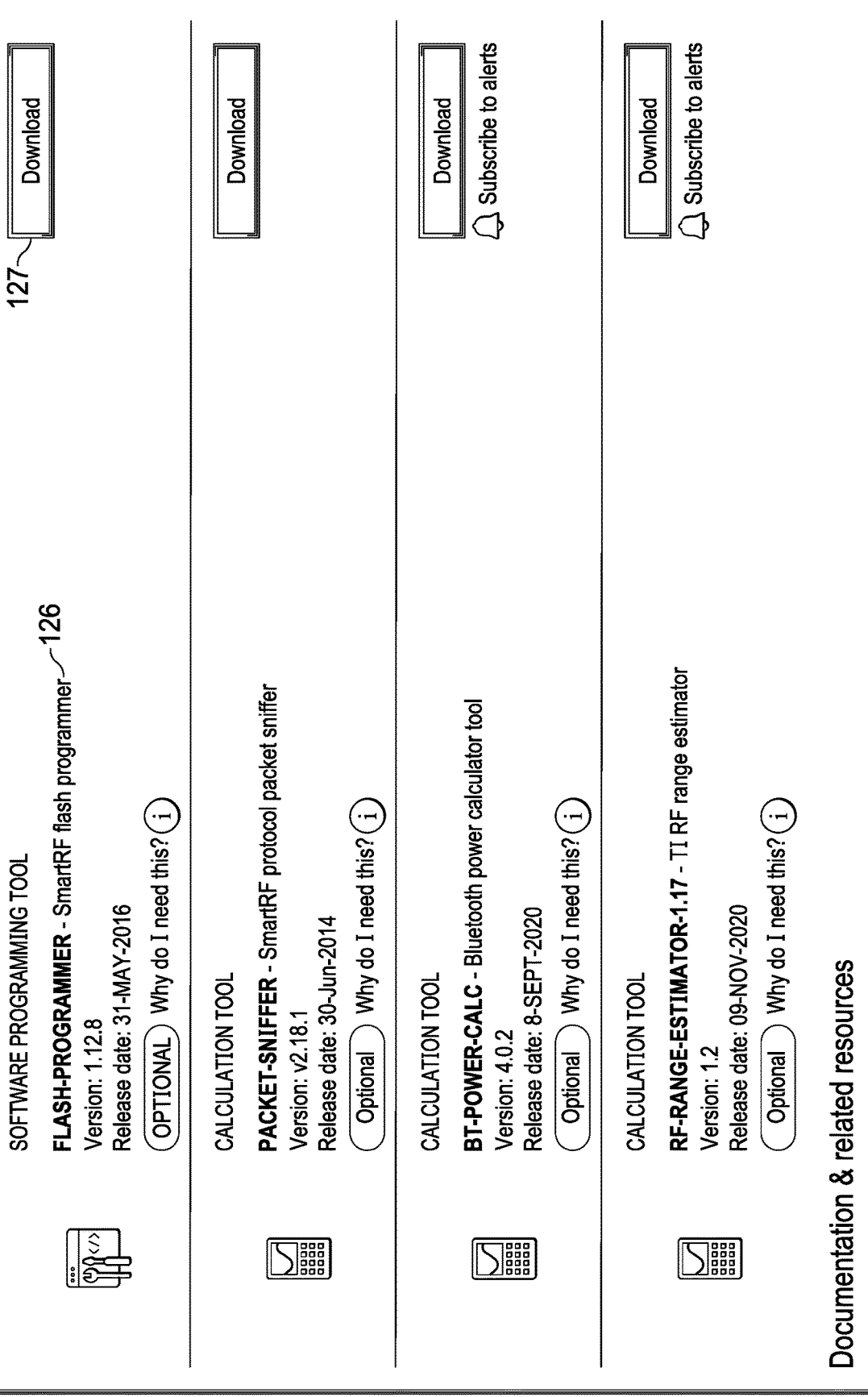

As previously mentioned herein, the platform selection section 108, if present, allows a user to choose a software execution platform for the selected package 104, the Bluetooth solutions package 104. FIGS. 1F-1H show the package resources section 110 when the user changes the software execution platform from TI Cloud (the default option for the selected package) to TI Code Composer Studio IDE. In this example, as can be seen by comparing FIGS. 1F-1H with FIGS. 1C-1D, changing the development platform changes the software products displayed in the package resources section 110 while the hardware products displayed are the same for both the TI Cloud and the TI Code Composer Studio™ IDE platforms. As can be seen in FIGS. 1G-1H, there are several required, required if the described design goal is to be achieved, and optional software products available when the software execution platform is the TI Code Composer Studio™ IDE.

Further, for some of the software products, e.g., the required CCStudio 124, there are download options, as evidenced by a user selectable "Download options" button

125. Selection of this button by the user opens a new web page with options for downloading the software and additional information about the software. The particular options and additional information may vary by the particular software product, but may include, for example, software downloads for different operating systems, links for documentation, links for release notes, links for forum discussions, etc.

For other software products, e.g., the optional Flash-Programmer 126, there is a user selectable "Download" button 127. Selection of this button by the user opens a new web page for downloading the optional software.

Figure 2:
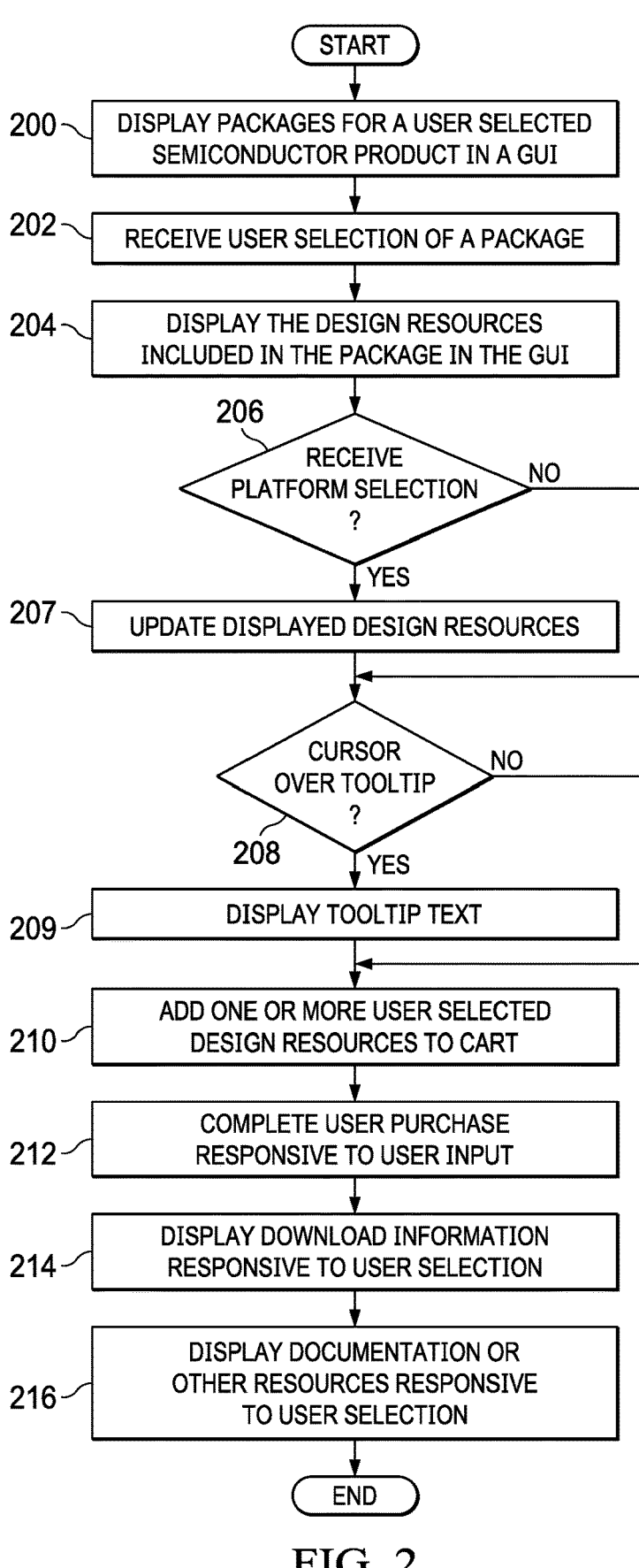
FIG. 2 is a flow diagram of a method for presenting design resources by design use case in a GUI.

FIG. 2 is a flow diagram of a method for presenting design resources by design use case in a graphical user interface (GUI). The method is explained in reference to the examples of FIGS. 1A-1H. Initially, the packages for a selected semiconductor product are displayed 200 in a GUI in a web page on a user's digital system, e.g., a desktop computer, a laptop computer, a tablet, or other device providing a web browser, in response to the user selecting a link for the web page. An example of such a web page is described herein in reference to FIGS. 1A and 1B.

The user can review the design use case descriptions for the displayed packages and select a view package button for a package that corresponds to the user's design use case. Responsive to receiving 202 user selection of a package, the design resources included in the package are displayed 204 in the GUI. An example of the display of the design resources for a user selected package is described herein in reference to FIGS. 1C and 1D. In the example, the package content is displayed in a collapsible window. In other embodiments, alternative approaches to displaying package design resources may be used, e.g., displaying the design resources for a selected package in another web page or replacing the content of the current web page with the package content.

As previously described herein in reference to the example of FIGS. 1C and 1D, the software and documentation resources displayed in the package content when the user selects a package are based on a default platform if multiple platform options are available. The user may select a desired platform for software execution from the options displayed in the package content, e.g., in the platform selection section 108. The particular options displayed depend on the product and selected package. If user selection of a platform other than the default selection is received 206 in the GUI, the GUI updates 207 the displayed design resources as needed to correspond to the selected software execution platform. If no platform selection is received, the displayed design resources are not changed. An example of the display of updated package resources responsive to user selection of a software execution platform is described herein in reference to FIGS. 1G and 1H.

As previously described herein in reference to the example of FIGS. 1C-1E, a displayed design resource may have an associated tooltip, e.g., tooltip 120. If the GUI receives an indication that the user has moved the cursor over a tooltip 208, the GUI displays 209 the tooltip text, e.g., in a popped up text box near the tooltip. If the GUI does not receive such an indication, no tooltip is displayed. While the flow diagram indicates a single activation of a tooltip for simplicity of explanation, the user may repeatedly select tooltips as desired to view the explanatory text.

If the user decides to purchase any of the displayed design resources, the GUI adds 210 the one or more user selected design resources to a virtual shopping cart, e.g., by selecting an "Add to cart" button 111 as described herein reference to FIG. 1C. The GUI also completes 212 the user purchase of the selected design resources responsive to user input. For example, as previously described herein in reference to FIG. 1C, the user may select an option to complete the purchase from a pop up window displayed in the GUI when the user adds a design resource to a virtual shopping cart. A new web page is then opened in the browser that allows the user to complete the purchase.

After the purchase is completed (or at any time the user desires), the user can request to download one or more software resources in the displayed package or to view documentation or other resources, e.g., videos, training, and forum discussions. The GUI displays 214 download information for a software resource responsive to user selection of, e.g., an associated download button 127 or download options button 125 as previously described herein in reference to FIGS. 1G and 1H. The GUI also displays 216 documentation or other resources responsive to user selection of a link, e.g., by causing a new web page with the content of the selected resource. The flow diagram of FIG. 2 and the example of FIGS. 1A-1H assume that software resources are available at no additional cost to the user and without making a hardware purchase. In other embodiments, there may be a cost associated with a software resource and the user may need to complete purchase of the software resource before being allowed to download.

FIG. 3 is a block diagram of an example digital system 300 that may be used to execute embodiments of the GUI described herein. The digital system 300 includes a processing unit 330 coupled to one or more input devices 304 (e.g., a mouse, a keyboard, or the like), and one or more output devices, such as a display screen 308. In some embodiments, the display screen 308 may be touch screen, thus allowing the display screen 308 to also function as an input device. The processing unit 330 may be, for example, a desktop computer, a workstation, a laptop computer, a tablet, a dedicated unit customized for a particular application, a server, or the like. The display screen 308 may be any suitable visual display unit such as, for example, a computer monitor, a light emitting diode (LED), liquid crystal display (LCD), or plasma display, a television, a high definition television, or a combination thereof. The display screen 308 can be used, for example, to display embodiments of the GUI described herein.

The processing unit 330 includes a processor 318, memory 314, a storage device 316, a video adapter 312, and an I/O interface 310 connected by a bus. The bus may be one or more of any type of several bus architectures including a memory bus or memory controller, a peripheral bus, video bus, or the like. The processor 318 may be any type of electronic data processor. For example, the processor 318 may be a processor, a Reduced Instruction Set Computer (RISC), an Application-Specific Integrated Circuit (ASIC), or the like. The memory 314, e.g., a non-transitory computer-readable medium, can be any type of system memory such as static random access memory (SRAM), dynamic random access memory (DRAM), synchronous DRAM (SDRAM), read-only memory (ROM), a combination thereof, or the like. Further, the memory 314 can include ROM for use at boot-up, and DRAM for data storage for use while executing programs.

The storage device 316, e.g., a non-transitory computer-readable medium, can include any type of storage device configured to store data, programs, and other information and to make the data, programs, and other information accessible via the bus. In one or more embodiments, the storage device 316 stores software instructions for a web browser to be executed by the processor 318 to perform embodiments of the methods described herein. The storage device 316 may be, for example, one or more of a hard disk drive, a magnetic disk drive, an optical disk drive, a solid state drive, or the like.

The video adapter 312 and the I/O interface 310 provide interfaces to couple external input and output devices to the processing unit 330. The processing unit 330 also includes a network interface 324. The network interface 324 allows the processing unit 330 to communicate with remote units via a network (not shown). For example, the network interface allows the processing unit 330 to communicate via a network with a server hosting a semiconductor product website to allow a user to interact with the website via a web browser. The network interface 324 may provide an interface for a wired link, such as an Ethernet cable or the like, and/or a wireless link via, for example, a local area network (LAN), a wide area network (WAN) such as the Internet, a cellular network, any other similar type of network and/or any combination thereof. The digital system 300 may also include other components not specifically shown. For example, the digital system 300 may include power supplies, cables, a motherboard, removable storage media, cases, and the like.

FIG. 4 is a flow diagram of a method for providing an embodiment of a graphical user interface (GUI) as described herein in a web browser on a user device. Initially, a user request for a product web page is received 400 in the web browser on the user device, e.g., by selecting a link for the semiconductor product in the web browser on the user device. The web browser on the user device then transmits 402 a request for the product web page to the product server indicated by the link.

A server control application executing on the product server generates 404 the product specific web page source code and transmits the product specific web page source code to the web browser on the user device. The web page source code generated by the server control application, which may be a combination of JavaScript instructions, Hypertext Markup Language (HTML) instructions, and Cascading Style Sheets (CSS) instructions, includes instructions for displaying the GUI in the web page, instructions for displaying the content of each package of design resources responsive to selection of the package, and instructions for responding to user selections in the GUI.

To determine the content of each package, including content specific to any software execution platforms that a user can select, the server control application may query one or more product databases stored on the product server. The resulting web page source code defines an embodiment of a GUI for the product as described herein in which responses to user selection of, for example, a package or a software execution platform or a tooltip or selection of a distributor are performed by the web browser without further interaction with the product server. The resulting web page source code also defines links for accessing any user selectable documentation and other resources displayed in a package or in the product web page.

The web browser on the user device receives 406 received the product specific web page source code and executes the source code to initialize the GUI. The web browser on the user device then displays 408 the GUI in a web page. The user may then use the GUI to select a package, purchases design resources, download software, etc. as previously described herein.

Figure 5:
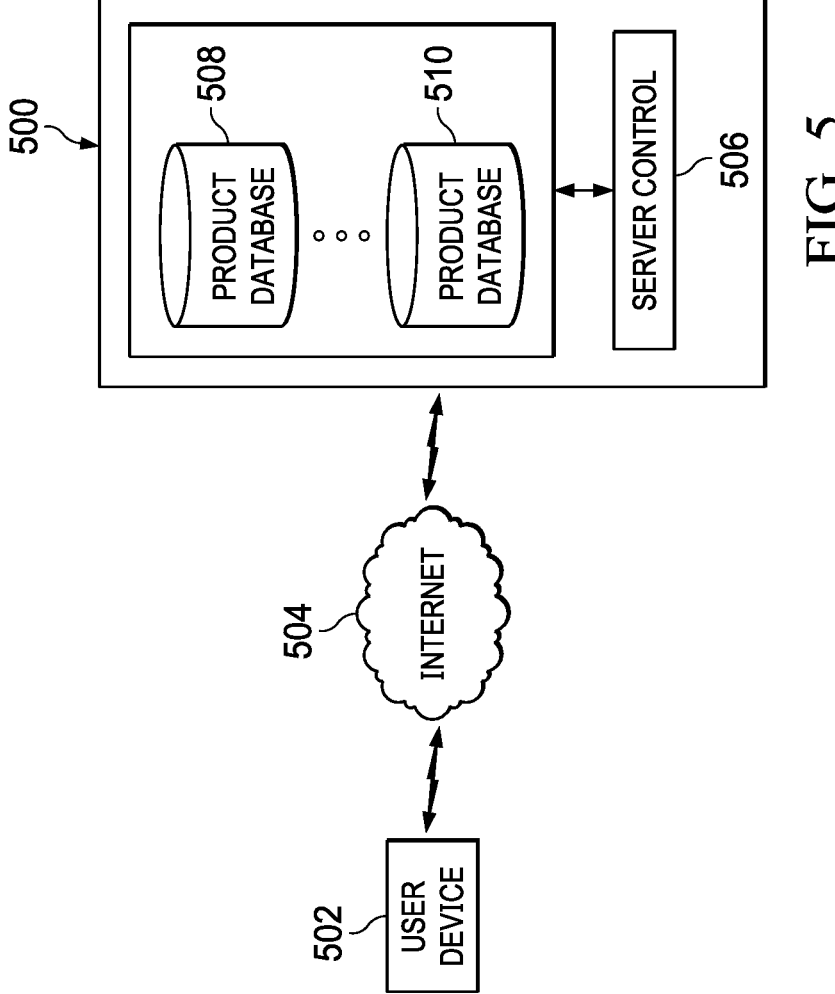
FIG. 5 is a block diagram of an example semiconductor product web server coupled to a user device.

FIG. 5 is a block diagram of an example web server 500 coupled to a user device 502 via the internet 504. Connectivity between the user device 502 and the web server 500 may be via various combinations of local area networks (LAN) and wireless connections, for example. The user device 502 may be an embodiment of the digital system 300 of FIG. 3 and hosts a web browser configured receive and execute product specific web page source code generated by the web server 500.

The web server 500 includes a server control application 506 and multiple product databases 508-510. As is described in more detail in reference to FIG. 4, the server control application 506 is configured to interact with the product databases 508-510 to generate and transmit product specific web page source code to the web browser executing on the user device 502 responsive to user selection of the product in the web browser. The product specific web page source code implements an embodiment of a GUI as described herein.

OTHER EMBODIMENTS

While the disclosure has been described with respect to a limited number of embodiments, those skilled in the art, having benefit of this disclosure, will appreciate that other embodiments can be devised which do not depart from the scope disclosed herein.

It is therefore contemplated that the appended claims will cover any such modifications of the embodiments as fall within the true scope of the disclosure.

What is claimed is:

1. A method comprising:
displaying, by at least one processor, in a graphical user interface (GUI), a first package for a first design use case for a semiconductor product and a second package for a second design use case for the semiconductor product, wherein the first package comprises first design resources comprising a first hardware resource and a first software resource, and the second package comprises second design resources comprising a second hardware resource and a second software resource, wherein the first hardware resource comprises a development kit or an evaluation board;
displaying, by the at least one processor, the first design resources in the first package in the GUI responsive to receiving user selection of the first package;
displaying, in the GUI and by the at least one processor and responsive to receiving user selection of the first package, a plurality of software execution platforms that are compatible with the first hardware resource, the plurality of software execution platforms including a default selected first software execution platform corresponding to the first software resource;
receiving, in the GUI and by the at least one processor, a selection of change from the first software execution platform to a second software execution platform of the plurality of software execution platforms; and
in response to receiving the selection of the second software execution platform, displaying, by the at least one processor, in the GUI, an updated first package with third design resources, the third design resources comprising the first hardware resource and a third software resource for corresponding to the second software execution platform.

2. The method of claim 1, wherein the first design resources, the second design resources, and the third design resources further comprise documentation resources.

3. The method of claim 1, wherein displaying the first design resources further comprises displaying the first design resources in a collapsible window.

4. The method of claim 1, wherein displaying the first design resources further comprises displaying with each design resource an indication of whether the design resource is required for the first design use case, is optional, or is required for a described design goal.

5. The method of claim 1, wherein displaying the first design resources further comprises displaying a tooltip for at least one design resource of the first design resources.

6. The method of claim 1, further comprising:

adding at least one design resource to a virtual shopping cart responsive to receiving a first user input; and completing user purchase of the at least one design resource responsive to receiving a second user input.

7. The method of claim 1, further comprising displaying, responsive to receiving a user the selection of the second software execution platform, download options for the third software resource in the third design resources.

8. The method of claim 1, further comprising displaying an explanation of why the first design resources are necessary for the first design use case.

9. The method of claim 1, further comprising downloading training resources of the first design resources.

10. A digital device comprising:

a display device; and at least one processor coupled to the display device, the at least one processor configured configurable to:

instruct the display device to display, in a graphical user interface (GUI), a first package for a first design use case for a semiconductor product and a second package for a second design use case for the semiconductor product, wherein the first package comprises first design resources comprising a first hardware resource and a first software resource, and the second package comprises second design resources comprising a second hardware resource and a second software resource, wherein the first hardware resource comprises a development kit or an evaluation board;

instruct the display device to display the first design resources in the first package in the GUI responsive to receiving a user selection of the first package;

instruct the display device to display in the GUI a plurality of software execution platforms for the first package in the GUI that are compatible with the first hardware resource, the plurality of software execution platforms including a default selected first software execution platform corresponding to the first software resource;

receive a selection of change from the first software execution platform to a second software execution platform of the plurality of software execution platforms; and in response to receiving the selection of the second software execution platform, instruct the display device to display, in the GUI, an updated first package with third design resources, the third design resources comprising the first hardware resource and a third software resource corresponding to the second software execution platform.

11. The digital device of claim 10, wherein the first design resources and the second design resources further comprise documentation resources.

12. The digital device of claim 10, wherein instructing the display device to display the first design resources further comprises instructing the display device to display the first design resources in a collapsible window.

13. The digital device of claim 10, wherein instructing the display device to display the first design resources further comprises instructing the display device to display indications of whether the first design resources are required for a design use case of the design use cases, are optional, or are required for a described design goal.

14. The digital device of claim 10, wherein instructing the display device to display the first design resources further comprises instructing the display device to display a tooltip for at least one design resource of the first design resources.

15. The digital device of claim 10, wherein the at least one processor is further configured to:

instruct the display device to add at least one design resource of the third design resources to a virtual shopping cart responsive to user input; and instruct the display device to complete user purchase of the at least one design resource responsive to user input.

16. The digital device of claim 10, wherein the at least one processor is further configured to: instruct the display device to display, responsive to user selection, download options for a software resource in the third design resources.

17. The digital device of claim 10, wherein the at least one processor is further configured to instruct the display device to display an explanation of why the first design resources are necessary for the first design use case.

18. The digital device of claim 10, wherein the at least one processor is further configured to download training resources of the third design resources.

19. A non-transitory computer-readable medium storing software instructions, the software instructions comprising software instructions to instruct at least one processor to:

instruct a display device to display, in a graphical user interface (GUI), a first package for a first design use case for a semiconductor product and a second package for a second design use case for the semiconductor product, wherein the first package comprises first design resources comprising a first hardware resource and a first software resource, and the second package comprises second design resources comprising a second hardware resource and a second software resource, wherein the first hardware resource comprises a development kit or an evaluation board;

instruct the display device to display the first design resources in the first package in the GUI responsive to receiving a user selection of the first package;

instruct the display device to display in the GUI a plurality of software execution platforms that are compatible with the first hardware resource, the plurality of software execution platforms including a default selected first software execution platform corresponding to the first software resource;

receive a selection of change from the first software execution platform to a second software execution platform of the plurality of software execution platforms; and in response to receiving the selection of the second software execution platform, instruct the display device to display, in the GUI, an updated first package with third design resources, the third design resources comprising the first hardware resource and a third software resource for corresponding to the second software execution platform.

20. The non-transitory computer-readable medium of claim 19, wherein the first design resources, the second design resources, and the third design resources further comprise documentation resources.

* * * * *